US012075953B2

(12) United States Patent
Connolly et al.

(10) Patent No.: US 12,075,953 B2
(45) Date of Patent: Sep. 3, 2024

(54) FITTING ASSEMBLY

(71) Applicant: Kohler Mira Limited, Glouchestershire (GB)

(72) Inventors: Ian Connolly, Cheltenham (GB); Richard Mead, Cheltenham (GB); Simon Westgate, Cheltenham (GB); Adam May, Cheltenham (GB); Robin Whitfield, Cheltenham (GB)

(73) Assignee: KOHLER MIRA LIMITED, Cheltenham (GB)

( * ) Notice: Subject to any disclaimer, the term of this patent is extended or adjusted under 35 U.S.C. 154(b) by 587 days.

(21) Appl. No.: 17/226,858

(22) Filed: Apr. 9, 2021

(65) Prior Publication Data

US 2021/0219797 A1   Jul. 22, 2021

Related U.S. Application Data

(63) Continuation of application No. PCT/GB2019/052177, filed on Aug. 2, 2019.

(30) Foreign Application Priority Data

Oct. 12, 2018 (GB) ..................... 1816651

(51) Int. Cl.
*A47K 17/02* (2006.01)
*A47K 3/00* (2006.01)
(Continued)

(52) U.S. Cl.
CPC ............ *A47K 17/022* (2013.01); *A47K 3/003* (2013.01); *F16M 13/022* (2013.01); *A47K 10/04* (2013.01);
(Continued)

(58) Field of Classification Search
CPC ...... A47K 17/022; A47K 3/003; A47K 10/04; A47K 2201/02; E03C 1/06; F16B 9/05; F16M 13/022
See application file for complete search history.

(56) References Cited

U.S. PATENT DOCUMENTS 6,257,530 B1 * 7/2001 Tsai ..................... F16L 3/127
248/74.2
8,371,549 B1   2/2013 Paquette
(Continued)

FOREIGN PATENT DOCUMENTS

CN   104720666 A   6/2015
CN   206342393     7/2017
(Continued)

OTHER PUBLICATIONS

Translation of CN 206342393 (Year: 2017).*
(Continued)

*Primary Examiner* — Monica E Millner
(74) *Attorney, Agent, or Firm* — Husch Blackwell LLP (57) ABSTRACT

A fitting assembly for attaching an elongate member to a surface within a shower or bath area includes a clamp including a collar arranged to receive and abut the elongate member, the collar having an axially extending split, the clamp further including a finger extending outwardly from the collar adjacent one side of the split. A cover includes an aperture arranged to receive the elongate member, the cover arranged to retain the clamp within such that the collar is axially aligned with the aperture. A bracket is arranged to be fixed to the surface and to receive and retain the cover containing the clamp, the bracket comprising a receiving portion arranged to urge the finger so as to compress the collar portion at the split, thereby clamping the elongate member within the collar.

13 Claims, 12 Drawing Sheets

(51) Int. Cl.
*F16M 13/02* (2006.01)
*A47K 10/04* (2006.01)
*E03C 1/06* (2006.01)
*F16B 9/00* (2006.01)
*F16L 3/12* (2006.01)

(52) U.S. Cl.
CPC ............ *A47K 2201/02* (2013.01); *E03C 1/06* (2013.01); *F16B 9/05* (2018.08); *F16L 3/12* (2013.01)

(56) References Cited

U.S. PATENT DOCUMENTS

| | | | | |
|---|---|---|---|---|
| 8,382,051 | B2* | 2/2013 | Smith | A47K 10/10 |
| | | | | 248/221.11 |
| 9,254,908 | B2* | 2/2016 | Healy | F16B 7/042 |
| 9,282,854 | B2* | 3/2016 | Kuo | A47K 10/10 |
| 2012/0145854 | A1 | 6/2012 | Smith | |
| 2019/0390447 | A1* | 12/2019 | Herzog | F16L 3/003 |

FOREIGN PATENT DOCUMENTS

| | | |
|---|---|---|
| CN | 206769464 | 12/2017 |
| CN | 207285980 | 5/2018 |
| EP | 1 529 996 A1 | 5/2005 |
| GB | 0 183 316 | 7/1922 |
| GB | 1 556 730 | 11/1979 |
| GB | 2 411 447 | 8/2005 |
| JP | 2004-150547 | 5/2004 |
| WO | WO2020074851 | 4/2020 |

OTHER PUBLICATIONS

EP 1 529 996—translation (Year: 2004).*
CN 206342393—translation (Year: 2017).*
First Chinese Office Action on CN Appl. Ser. No. 201980065429.X dated Mar. 7, 2022 (20 pages).
GB Combined Search and Examination Report GB Application No. 1816651.2 dated Mar. 19, 2019; 9 pages.

* cited by examiner

FITTING ASSEMBLY

CROSS-REFERENCE TO RELATED PATENT APPLICATIONS

This application is a Continuation of PCT/GB2019/052177, filed Aug. 2, 2019, which claims priority to United Kingdom Patent Application No. GB 1816651.2, filed Oct. 12, 2018, the disclosures of both of which are incorporated herein by reference in their entireties.

BACKGROUND

The present disclosure relates to a fitting assembly, and in particular a fitting assembly for attaching an elongate member, such as a rail, tube, or pipe to a surface, such as a wall, within or in the vicinity of a shower area.

Existing fitting assemblies for installing pipes and rails to walls or surfaces within shower areas, such as shower enclosures or shower cubicles, tend to require multiple component parts to be secured together by means of small grub screws which results in a cumbersome and time-consuming installation procedure. Furthermore, the screws may corrode over time or become lodged with debris or lime scale making it difficult to remove or adjust the fitting at a later time without damaging the fitting, pipe/rail or both.

It is an object of the present disclosure to provide an improved fitting assembly which makes it both easier and quicker to fit rails, tubes and the like within the confines of a bathroom, and more particularly within or in the vicinity of a shower or bath area, which may comprise a shower enclosure, a shower cubicle and/or a bathtub.

SUMMARY

An exemplary embodiment relates to a fitting assembly for attaching an elongate member to a surface within a shower or bath area. The fitting assembly includes a clamp comprising a collar arranged to receive and abut the elongate member. The collar has an axially extending split, the clamp further comprising a finger extending outwardly from the collar adjacent one side of the split. The fitting assembly also includes a cover comprising an aperture arranged to receive the elongate member, the cover arranged to retain the clamp within such that the collar is axially aligned with the aperture and further arranged to prevent rotation of the clamp with respect to the cover. The fitting assembly also includes a bracket arranged to be fixed to the surface and to receive and retain the cover containing the clamp, the bracket comprising a receiving portion comprising one or more ribs arranged to urge the finger so as to compress the collar portion at the split, thereby clamping the elongate member within the collar.

Another exemplary embodiment relates to a fitting assembly for attaching an elongate member to a surface within a shower or bath area. The fitting assembly includes a clamp comprising a collar arranged to receive and abut the elongate member, the collar having an axially extending split. The clamp further includes a pair of opposing fingers extending outward from the collar adjacent either side of the split. A bracket is arranged to be fixed to the surface and to receive and retain the clamp, the bracket comprising a receiving portion comprising one or more ribs arranged to urge the opposing fingers towards each other to thereby compress the collar portion at the split and clamp the elongate member within the collar. The one or more fingers of the clamp comprise one or more outwardly facing recessed slots arranged to interlock with the receiving portion of the bracket.

BRIEF DESCRIPTION OF THE DRAWINGS

Example embodiments will now be described with reference to the accompanying drawings, in which.

DETAILED DESCRIPTION

A first aspect provides a fitting assembly for attaching an elongate member to a surface within a shower or bath area, the fitting assembly comprising: a clamp comprising a collar arranged to receive and abut the elongate member, the collar having an axially extending split, the clamp further comprising a finger extending outwardly from the collar adjacent one side of the split; a cover comprising an aperture arranged to receive the elongate member, the cover arranged to retain the clamp within such that the collar is axially aligned with the aperture; and a bracket arranged to be fixed to the surface and to receive and retain the cover containing the clamp, the bracket comprising a receiving portion arranged to urge the finger so as to compress the collar portion at the split, thereby clamping the elongate member within the collar.

Advantageously, the elongate member, such as a rail or pipe, is held within the collar by friction, rather than with a screw, for example. When the cover, containing the clamp, is pushed onto the bracket the collar tightens around the elongate member as a result of the finger being urged by the receiving portion of the bracket in a manner so as to close or reduce the split in the collar—thereby tightening the collar around the elongate member. Therefore, in one single movement the cover is secured onto the bracket, which is mounted to the surface, and the elongate member is secured in the collar which is itself retained inside the cover. This results in the elongate member being secured to the surface, such as a wall of a shower or bath area.

The clamp may comprise a pair of opposing fingers extending outward from the collar adjacent either side of the split. The receiving portion of the bracket may be arranged to urge the opposing fingers towards each other thereby compressing the collar portion at the split and clamping the elongate member within the collar when the cover containing the clamp is engaged with the bracket.

By forming the clamp with a pair of opposing fingers arranged either side of the split, the clamp may be more stable in operation because lateral forces arising within the fitting assembly are inherently balanced. Further, this gives rise to a plane of symmetry in the fitting assembly which may provide advantages such as simplified manufacturing or assembly of the fitting assembly. The opposing fingers may extend approximately parallel to each other. There may be a separation, typically a small separation, between the opposing fingers as dictated by the split.

The receiving portion of the bracket may comprise one or more ribs. Ribs are well suited to abutting against the finger or pair of opposing fingers so as to tighten the collar around the elongate member. The ribs may be formed with a smooth, graded inclined surface so as to gently urge the fingers together (or the single finger to one side) as the cover containing the clamp is slid onto the bracket. In this manner a smooth insertion force of the cover containing the clamp onto the bracket may be allowed for, rather than a sudden snap fit.

The bracket may comprise one or more locking tabs arranged to engage with one or more corresponding notches provided on the cover, thereby locking the cover and the bracket together when the cover containing the clamp is engaged with the bracket. In this manner, once the cover containing the clamp has been pushed far enough onto the bracket that the notches align with the tabs the whole assembly may be locked together. This may prevent the assembly being unintentionally disassembled, and/or the elongate member being accidentally released, unless the tabs are deliberately depressed to enable the cover containing the clamp to be slid off the bracket.

The cover may comprise one or more projections or recesses located on opposing interior surfaces of the cover, which may be arranged to engage with one or more corresponding recesses/openings or projections of the clamp with a snap fit to thereby retain the clamp securely within the cover. In this manner, the clamp can be provided as a separate part which may be quickly and easily secured inside the cover and removed if required at a later stage, e.g. to replace the clamp. This also enables different sized clamps (e.g. collars having different radii in embodiments where the collar has a circular cross section) to be provided with a single cover and bracket and assembled in situ to suit a range of different elongate member radii.

The bracket may be arranged to be fixed to the surface by means of one or more mechanical fasteners, e.g. screws. In this manner the bracket may be secured to the surface, e.g. a wall of a shower area. Alternatively or additionally, the bracket may be adapted to be affixed to the surface by other means, such as adhesive pads, glue or a suction mount, which may be arranged for example to fix the bracket onto a surface such as shower enclosure or cubicle wall, glass screen, or mirror thereof.

The elongate member may be a pipe, such as a riser pipe, or a rail, such as a towel rail, an ornamental or decorative rail or a guide rail (e.g. a hand rail) to aid support for a user of the shower.

This fitting assembly may be modular in nature.

The one or more fingers of the clamp may comprise one or more outwardly facing recessed slots arranged to interlock with the receiving portion of the bracket. This may help to increase the load bearing capability of the fitting assembly once assembled.

A second aspect provides a fitting assembly for attaching an elongate member to a surface within a shower or bath area, the fitting assembly comprising: a clamp comprising a collar arranged to receive and abut the elongate member, the collar having an axially extending split, the clamp further comprising a pair of opposing fingers extending outward from the collar adjacent either side of the split; and a bracket arranged to be fixed to the surface and to receive and retain the clamp, the bracket comprising a receiving portion arranged to urge the opposing fingers towards each other to thereby compress the collar portion at the split and clamp the elongate member within the collar.

In the fitting assembly according to the second aspect, the clamp has a pair of opposing fingers extending outward from the collar adjacent either side of the split. In this aspect, a cover portion (as defined in other aspects) is not essential—since the clamp may be activated by, and retained in, the bracket without the presence of a cover. However, a cover may also optionally be provided for aesthetic purposes and to add additional stability to the fitting assembly.

A third aspect provides a kit of parts arranged to be assembled to form a fitting assembly according to the first aspect or the second aspect. The kit of parts may comprise the fitting assembly according to the first aspect or the second aspect, a means for fixing the bracket of the fitting assembly to a surface and an elongate member.

Said means for fixing the bracket of the fitting assembly to a surface may include a mechanical fastener such as a screw, an adhesive pad or a suction mount.

A fourth aspect provides a shower or bath area comprising an elongate member supported by one or more fitting assemblies according to the first aspect or the second aspect.

The shower or bath area may comprise a shower cubicle, a shower enclosure and/or a bathtub. One or more ablutionary fittings may be provided in the shower or bath area.

A fifth aspect provides a method of attaching an elongate member to a surface within a shower or bath area, the method comprising: providing a fitting assembly according to the first aspect; fixing the bracket to the surface in the shower or bath area; inserting the clamp into the cover; inserting the elongate member through the aperture of the cover and the collar of the clamp; and sliding the cover containing the clamp onto the bracket, thereby causing the collar to tighten around the elongate member to attach the elongate member to the surface.

The collar tightens around the elongate member because when the cover containing the clamp is installed/slid onto the bracket, the one or more fingers of the clamp are urged by means of the receiving portion of the bracket so as to reduce or close the split in the collar, thereby securing the collar around the elongate member and effectively clamping the elongate member.

A sixth aspect provides a method of attaching an elongate member to a surface within a shower or bath area, the method comprising: providing a fitting assembly according to the second aspect; fixing the bracket to the surface in the shower or bath area; inserting the elongate member through the collar of the clamp; and sliding the clamp onto the bracket, thereby causing the collar to tighten around the elongate member to attach the elongate member to the surface.

Except where mutually exclusive, any of the features of the first aspect may be employed mutatis *mutandis* in the second and other aspects.

Figure 1:
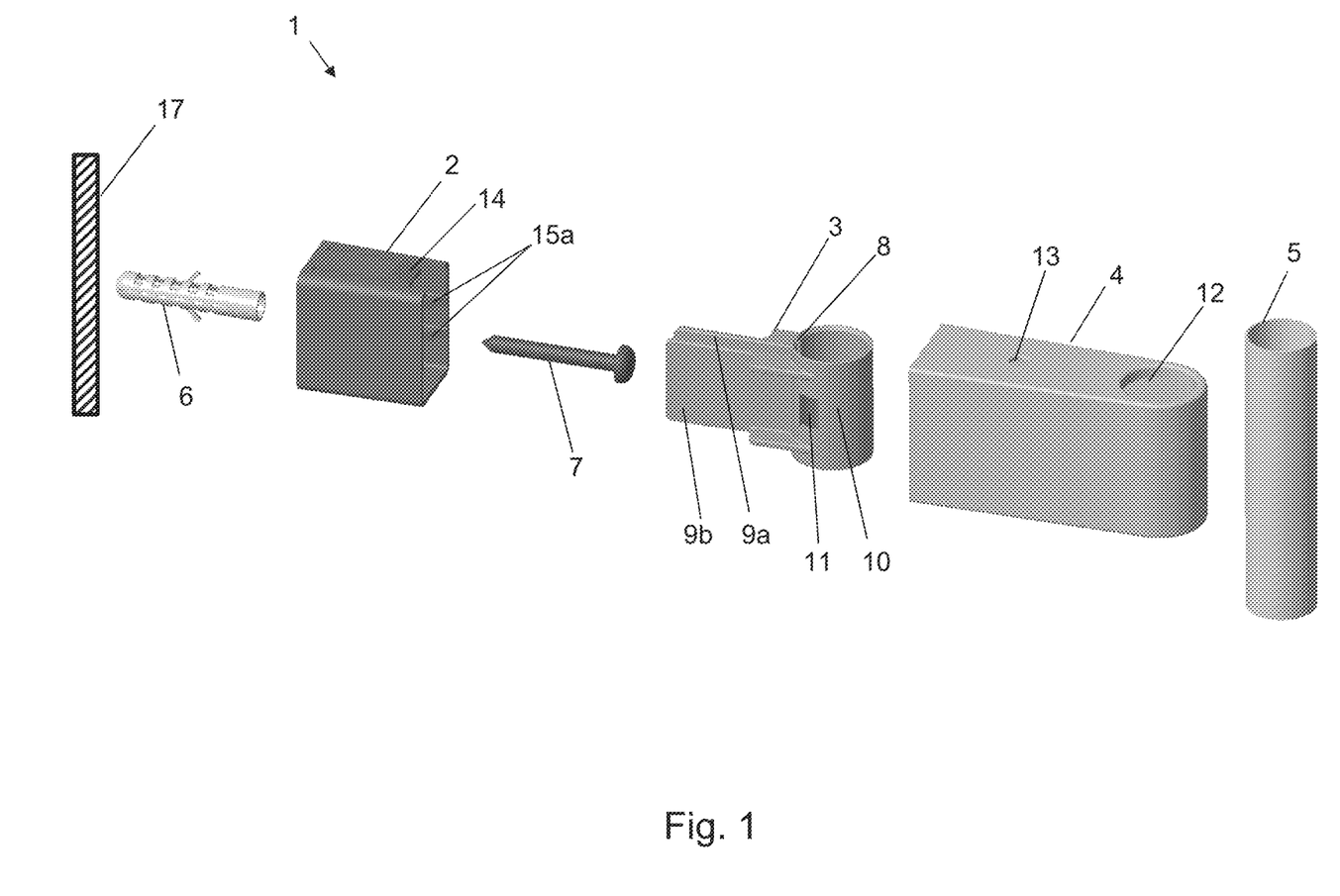
FIG. 1 is an exploded perspective view of a fitting assembly according to the present disclosure.

Components of a fitting assembly 1 according to the present disclosure are illustrated in FIG. 1. The fitting assembly 1 comprises a bracket 2, a clamp 3 and a cover 4. The fitting assembly is suitable for attaching an elongate member 5, such as a pipe or rail, to a surface 17 within a bathroom, such as a wall of a shower area. The bracket 2 is fixed to the surface 17 using, for example, a wall plug 6 and screw 7, although other means are also envisaged such as adhesive pads or suction mounts and the like.

The clamp 3 comprises a collar 10 which is arranged to receive and secure around the elongate member 5. The collar 10 has an axially-extending split 8 along the length of one side of the collar 10. The split 8 may run the full length of the collar 10 or only part of the length, e.g. 80% or 90% thereof. The clamp 3 also has a pair of opposing fingers 9a and 9b extending radially outward from the collar 10 adjacent either side of the split 8. In the absence of any inward force being applied to the fingers 9a and 9b, the collar 10 is loose enough to permit the elongate member 5 to be slid into the collar 10 in the axial direction without the elongate member encountering significant resistance, e.g. it may only be held loosely in the collar 10 at first. Once inserted into the collar 10, the elongate member 5 can be clamped tightly in place by imparting an inward force onto the two fingers 9a and 9b, in order to urge the fingers 9a and 9b together thereby substantially closing the split 8 and clamping the collar 10 tightly around the elongate member 5 by effectively reducing the radius of the collar 10 slightly at the split 8. In this manner the elongate member 5 is held in the collar 10 of the clamp 3 by friction, i.e. an interference fit is achieved.

Figure 2A:
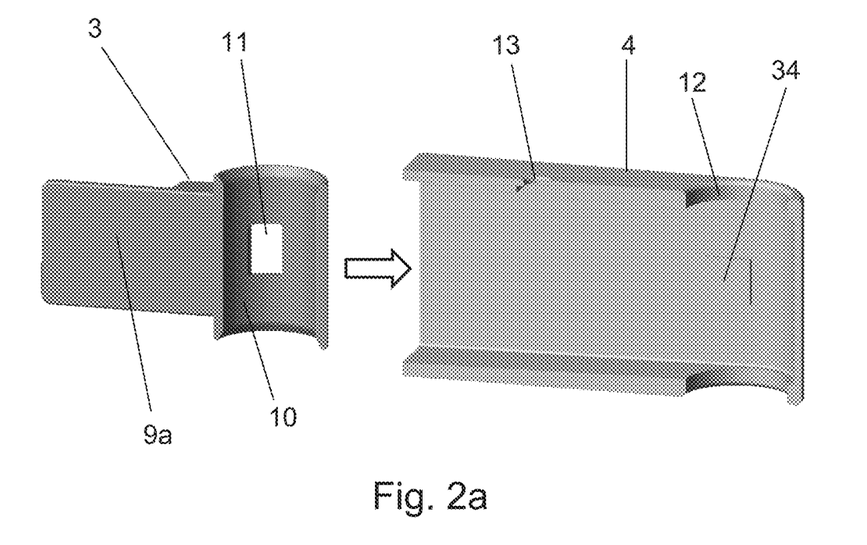
FIGS. 2a and 2b illustrate the clamp and cover of a fitting according to the present disclosure.
Figure 2B:
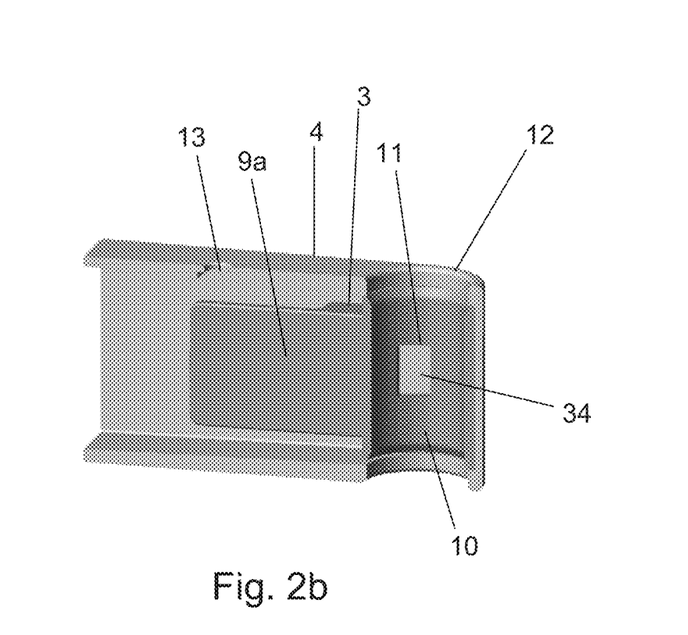

With reference to FIGS. 2a and 2b, which are cutaway views of the clamp 3 and cover 4, the clamp 3 has a pair of diametrically opposed openings or recesses 11 in walls of the collar 10 which are arranged to engage with corresponding projections 34 provided on opposing interior surfaces of the cover 4. The clamp 3 is secured and retained in place inside the cover 4 by means of a snap fit between openings 11 of the clamp 3 and the projections 34 of the cover 4.

In this manner the clamp 3 is manufactured as a separate component and then subsequently assembled into the cover 4 either by the end user or by the manufacturer.

Figure 3A:
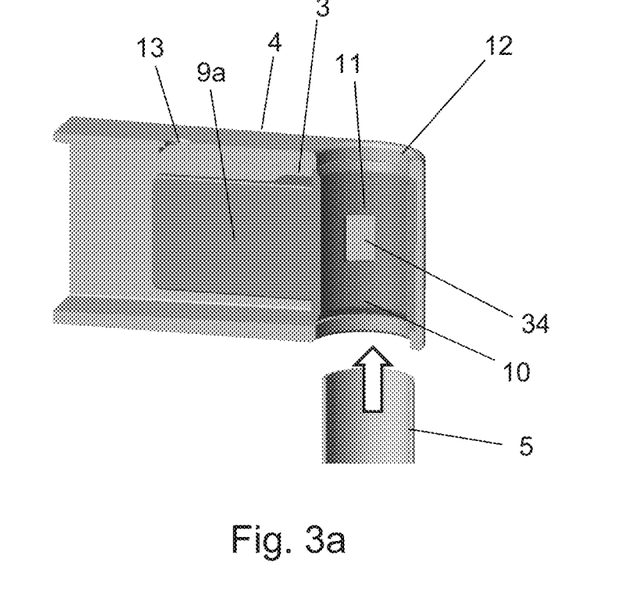
FIGS. 3a and 3b illustrate the insertion of an elongate member into the clamp when it is secured inside the cover.
Figure 3B:
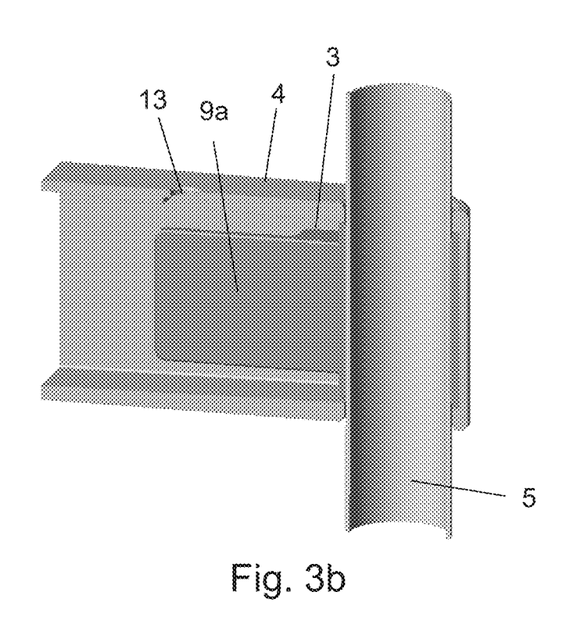

With reference to FIGS. 3a and 3b, when the clamp 3 is securely retained inside the cover 4 by means of the snap fit between the openings 11 of the clamp 3 and the projections 34 of the cover 4, the collar 10 of the clamp 3 is axially aligned with a through aperture 12 of the cover 4 such that the elongate member 5 can be slid through the aperture 12 of the cover 4 and the collar 10 of the clamp 3 in one movement. The elongate member 5 may extend outwards from either side of the cover 4, e.g. if the fitting assembly 1 is being provided at an intermediate/midway position on the elongate member 5. Alternatively, the elongate member 5 may terminate inside the cover 4 at an axial position just past the collar 10, e.g. if the fitting assembly 1 is being provided at an end position of the elongate member 5.

Figure 4:
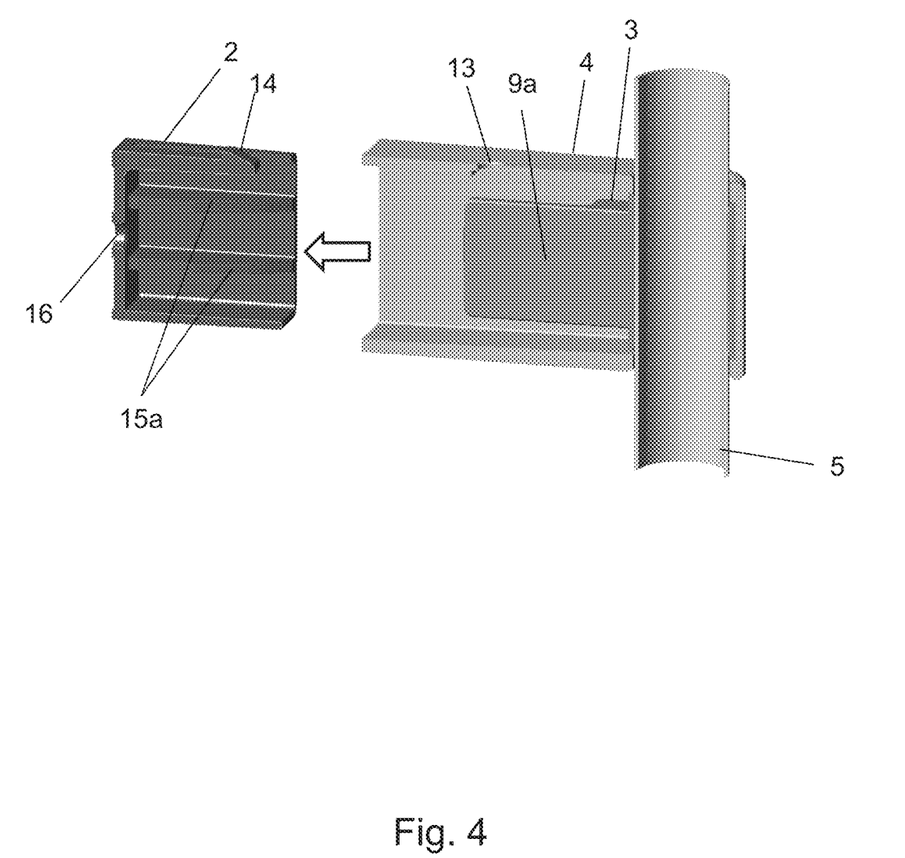
FIG. 4 illustrates the installation of the cover containing the clamp onto the bracket.

With reference to FIG. 4, the cover 4 containing the clamp 3 fixed inside and having the elongate member 5 inserted therein is then installed onto the bracket 2 which is itself secured to the surface 17 in the manner described herein. The bracket 2 has a receiving portion comprising internal ribs 15a and 15b on opposing interior surfaces which are arranged to urge the fingers 9a and 9b respectively of the clamp 3 inwards towards each other so as to compress the collar portion 10 at the split 8, thereby clamping the elongate member 5 securely within the collar 10. The cover 4 slides over the bracket 2 such that the bracket 2 is not visible once the fitting assembly 1 is assembled. An outwardly-facing locking tab 14 on the bracket 2 engages a corresponding notch 13 on the cover 4 when the cover 4 is slid onto the bracket 2. In this manner, the cover 4 cannot be slid back off the bracket 2 without depressing the locking tab 14, so as to prevent accidental disengagement of the cover 4 and clamp 3 portion of the fitting assembly 1 from the bracket 2. Also shown in FIG. 4 is a screw hole 16 of the bracket 2 through which the bracket 2 may be fixed to the wall 17 by means of a screw 7 and wall plug 6 as described above.

Figure 5A:
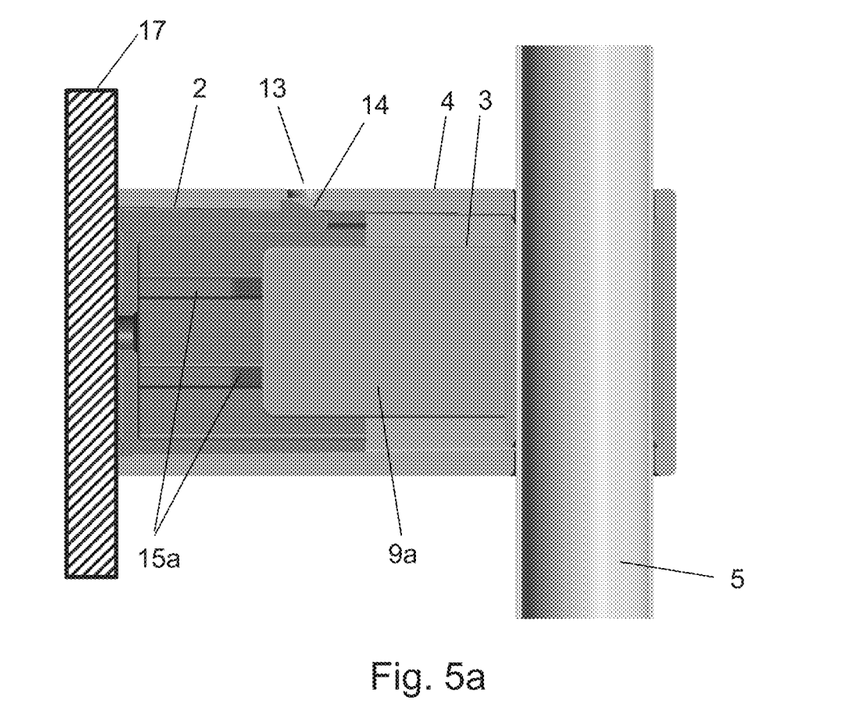
FIGS. 5a and 5b illustrate the complete fitting assembly attaching an elongate member to a wall.
Figure 5B:
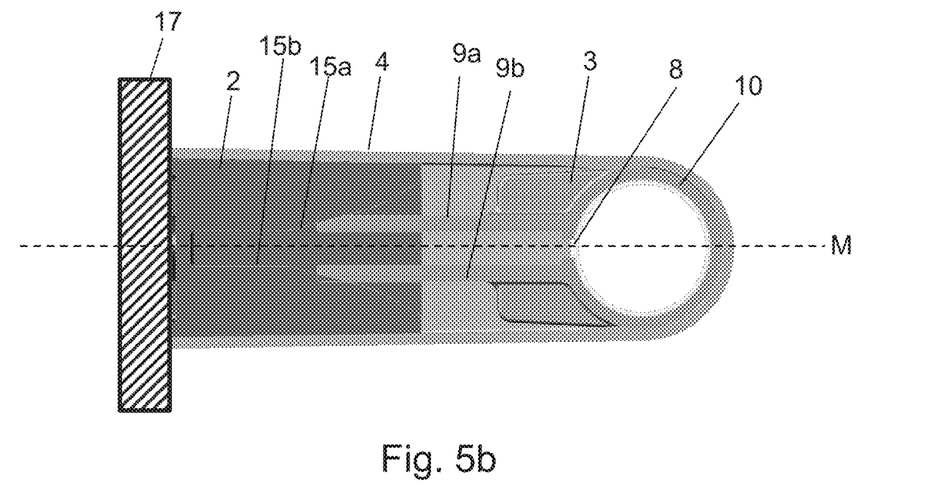
Figure 6A:
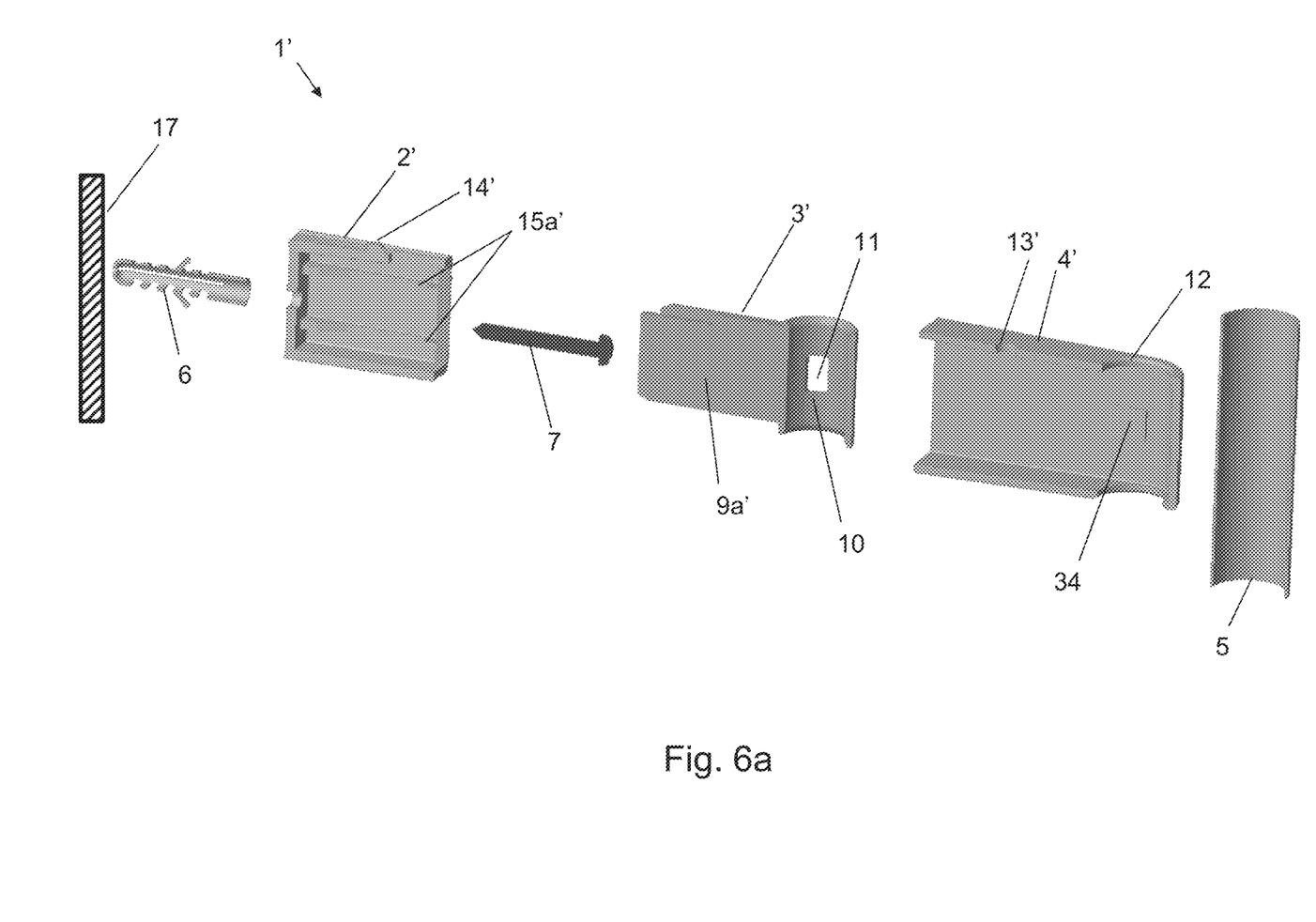
FIGS. 6a and 6b are exploded cut-away and complete perspective views respectively of a second fitting assembly according to the present disclosure.
Figure 6B:
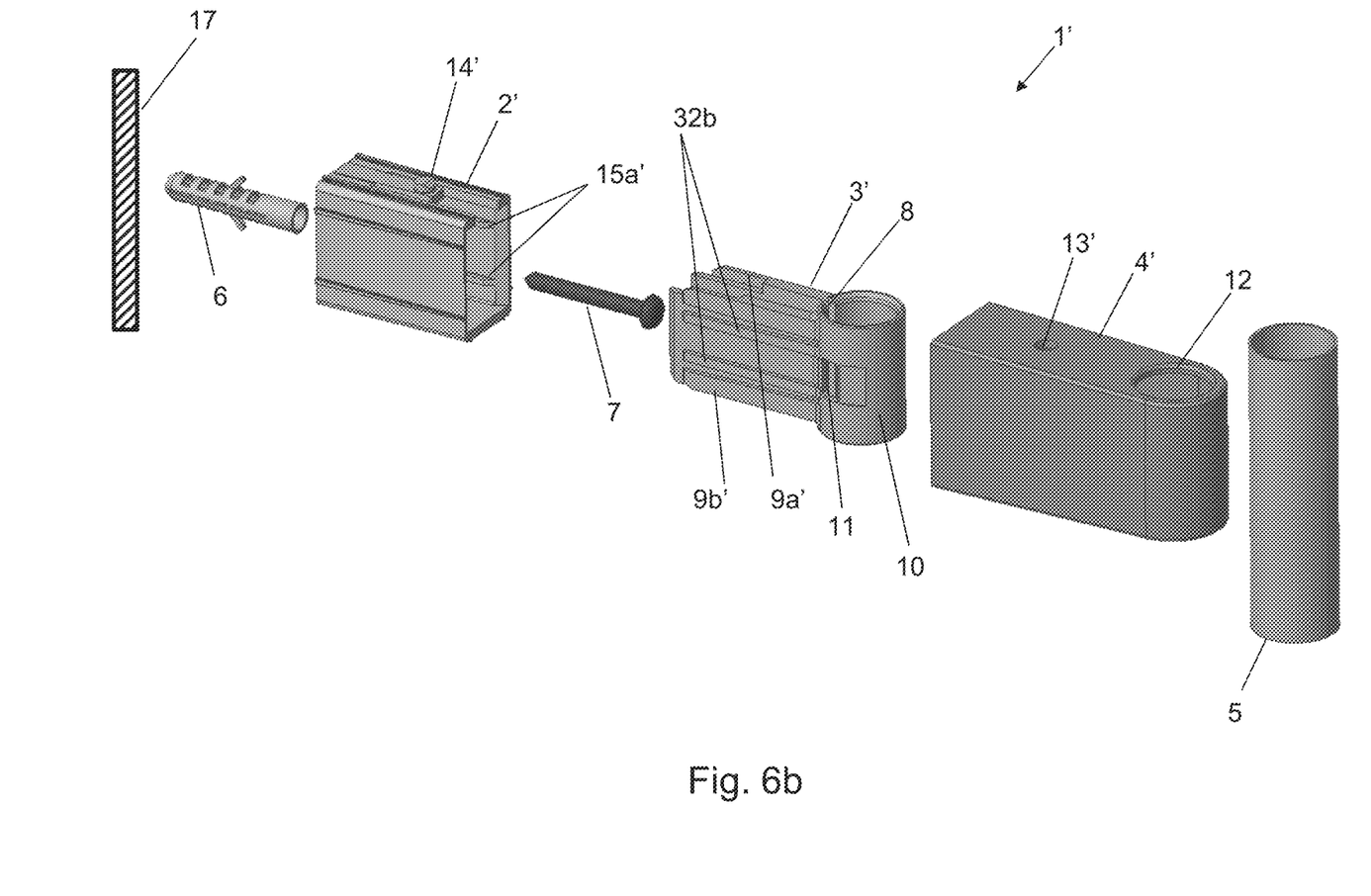
Figure 7A:
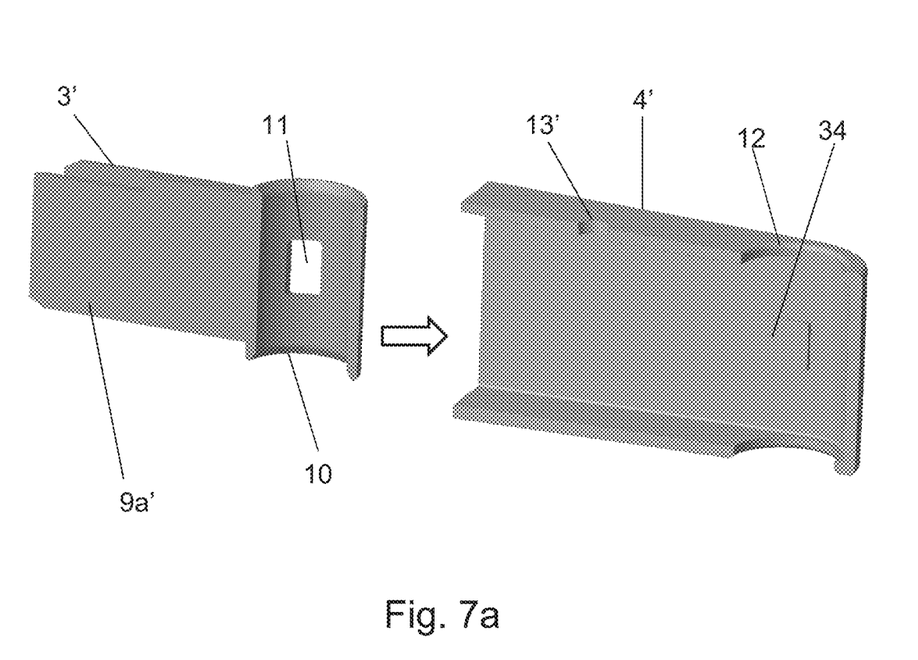
FIGS. 7a and 7b illustrate the clamp and cover of the second fitting according to the present disclosure.
Figure 7B:
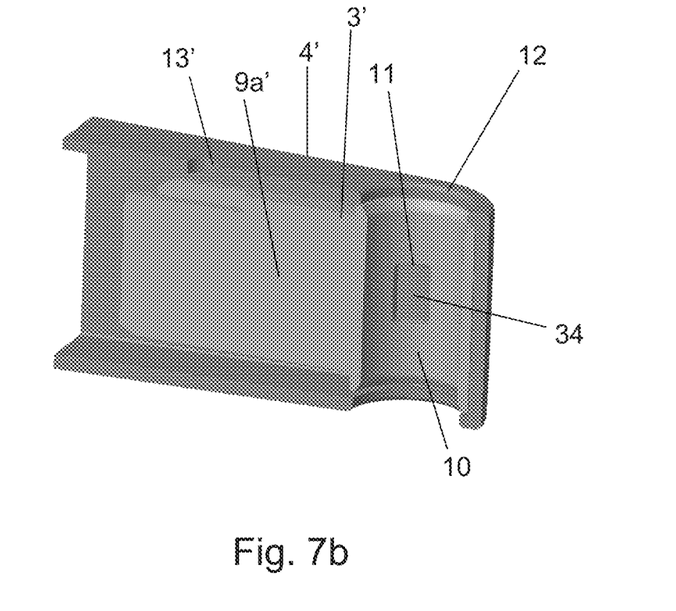
Figure 8:
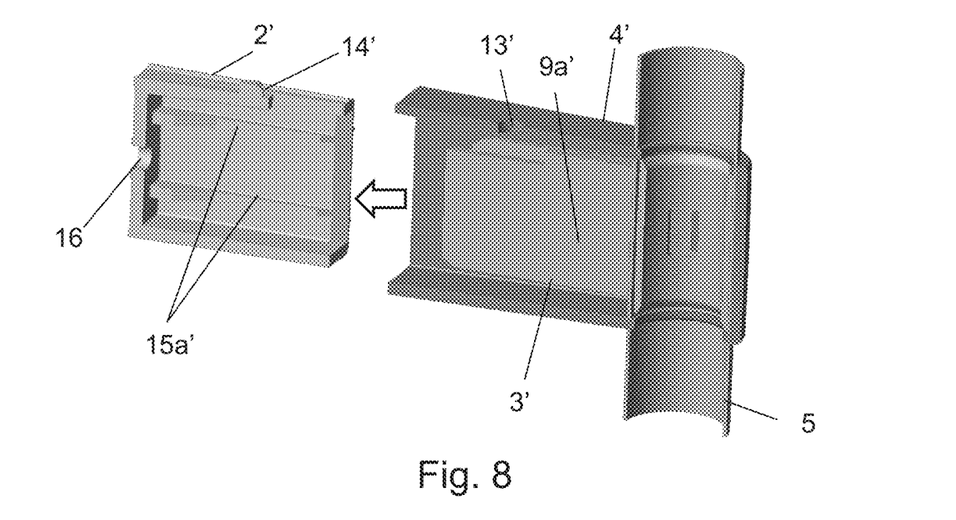
FIG. 8 illustrates the installation of the cover containing the clamp onto the bracket for the second fitting assembly according to the present disclosure.
Figure 9:
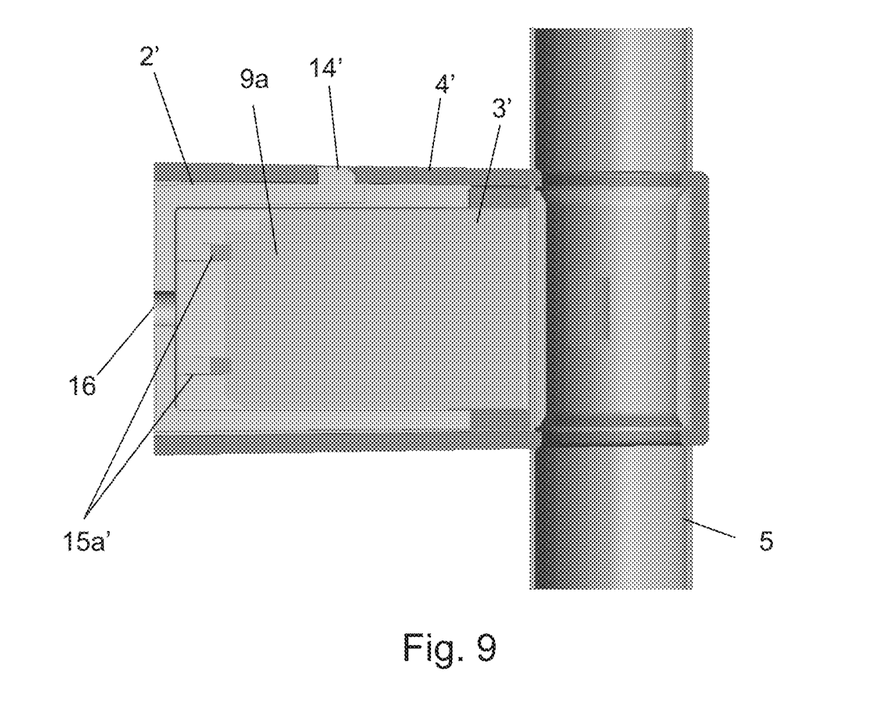
FIGS. 9, 10 and 11 illustrate the assembled second fitting assembly according to the present disclosure when attaching an elongate member to a wall.
Figure 10:
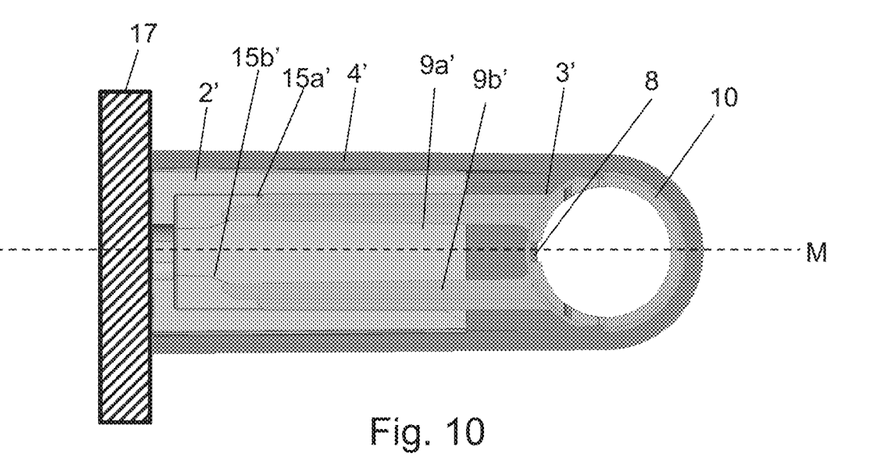

FIGS. 5a and 5b show the complete fitting assembly 1 when it is attaching the elongate member 5 to a wall 17. As is evident from the cross-sectional view of FIG. 5b, the fitting assembly generally has a line of mirror symmetry M as a result of the opposing pair of fingers 9a, 9b of the clamp 3 and corresponding ribs 15a, 15b on opposing surfaces inside the bracket 2. This symmetry may have the result that minimal bending moments arise within the assembly 1 from the inwards forces acting on the fingers 9a and 9b.

Whilst the clamp 3 of the fitting assembly 1 described above with reference to the accompanying drawings has two opposing fingers 9a, 9b, other numbers of fingers are also envisaged as falling within the scope of the present disclosure. For example, the clamp 3 could alternatively be provided with a single finger extending radially outward from the collar 10 adjacent one side of the split 8. In this manner, when the cover 4 containing and retaining the clamp 3 is inserted onto the bracket 2, one of the ribs 15a, 15b of the bracket will urge the single finger so as to compress the collar portion 10 at the split 8, thereby clamping the elongate member 5 within the collar 10 in a similar manner to that described above with reference to the pair of fingers 9a, 9b. The single finger operation is aided if the clamp 3 is held securely inside the cover 4 by means of the snap fit resulting from the cooperation of the recesses/openings 11 of the clamp 3 with the projections 34 of the cover. Because of this snap fit, when a force is imparted onto the single finger, the clamp 3 cannot rotate within the cover 4 and therefore the force will instead cause the split 8 to close, thereby clamping the collar 10 around the elongate member 5. For the case where the clamp 3 has a pair of opposing fingers 9a, 9b as described above, the inwards forces imparted on the fingers 9a, 9b by the ribs 15a, 15b do not result in any significant rotational force due to the symmetry of the forces acting on the clamp 3 inside the cover 4.

The components of the fitting assembly 1, including the bracket 2, clamp 3 and cover 4 may be formed of any suitable, durable material, such as, but not limited to, an engineering plastic comprising, or consisting essentially of, polypropylene, polyethylene, or acetal (polyoxymethylene). The material should allow for expansion and contraction of the collar 10 about the split 8 over several use cycles without cracking.

The clamp 3 and cover 4 may be provided as a single, materially continuous component rather than two discrete components assembled together in the manner described above. The cover may be colored and/or at least partially coated. The cover may be at least partially painted or plated, e.g. chrome plated or plated with another metal or alloy. Accordingly, the cover may be provided so as to match or complement one or more other fittings within the shower area.

Whilst in the drawings the collar 10, aperture 12 and elongate member 5 are shown as having circular cross-sections it would be appreciated by one skilled in the art that other cross sections could be used. For instance, the elongate member may have a polygonal cross section and the collar may have a corresponding polygonal cross section with, for example, the split at one apex thereof. For example, the elongate member may have a triangular cross section and the collar may have a corresponding triangular cross section with the split at one apex thereof. Alternatively, the elongate member may have a rectangular cross section and the collar may have a corresponding rectangular cross section with the split on one edge or corner thereof. As such, the term "collar" as used herein is not to be understood as being limiting to a circular cross section.

Figure 11:
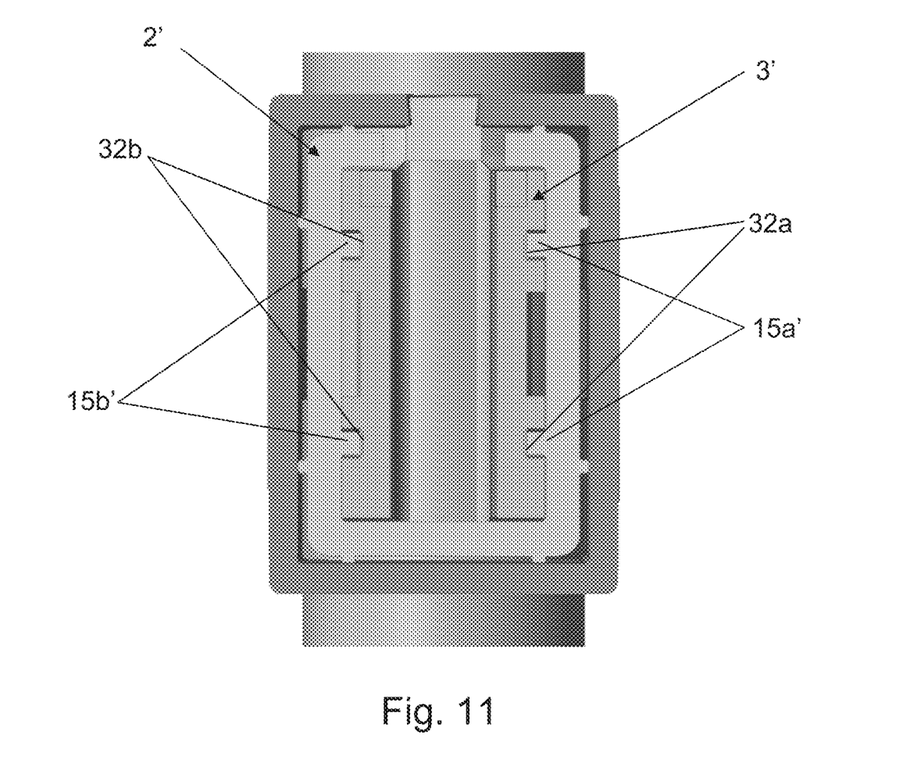

FIGS. 6 to 11 illustrate a second fitting assembly 1' according to the present disclosure. In numerous regards the second fitting assembly 1' is similar or identical to the fitting assembly 1 described above with reference to FIGS. 1 to 5 and as such like reference numerals have been used to label like components. In the second fitting assembly 1' the clamp 3' has a pair of opposing fingers 9a' and 9b' extending radially outward from the collar 10 adjacent either side of the split 8 and in addition, each finger 9a' and 9b' comprises a pair of outwardly facing recessed slots 32a and 32b running parallel to each other and parallel to the respective finger. These recessed slots 32a, 32b of the clamp 3' are sized so as to mate with a receiving portion comprising internal ribs 15a' and 15b' on opposing interior surfaces of a bracket 2' which is illustrated in FIG. 11. The alternative bracket 2' is similar to the bracket 2 described above except that the ribs 15a' and 15b' are sized to fit snugly within the slots 32a and 32b respectively of the clamp 3'. The ribs 15a' and 15b' are also arranged to urge the fingers 9a' and 9b' of the clamp 3' inwards towards each other so as to compress the collar portion 10 at the split 8, thereby clamping the elongate member 5 securely within the collar 10 in the same manner as described above. This interlocking of the ribs 15a' and 15b' with the recessed slots 32a and 32b of the clamp 3' helps to increase the loading strength of the second fitting assembly 1' once assembled and holding an elongate member 5. For example, the second fitting assembly 1' may tolerate a load of 60-80 kg being applied on the elongate member 5 in a direction parallel to the elongate member as a result of the four contact points resulting from the interlocking of the ribs 15a' and 15b' with the recessed slots 32a and 32b of the clamp 3'. In this second exemplary fitting assembly 1', the bracket 2' has an outwardly extending peg 14' which is arranged to engage a corresponding notch/hole 13' on the cover 4'. The peg 14' and hole 13' have a reverse draft to further improve the locking of the cover 4' onto the bracket 2'.

Figure 12:
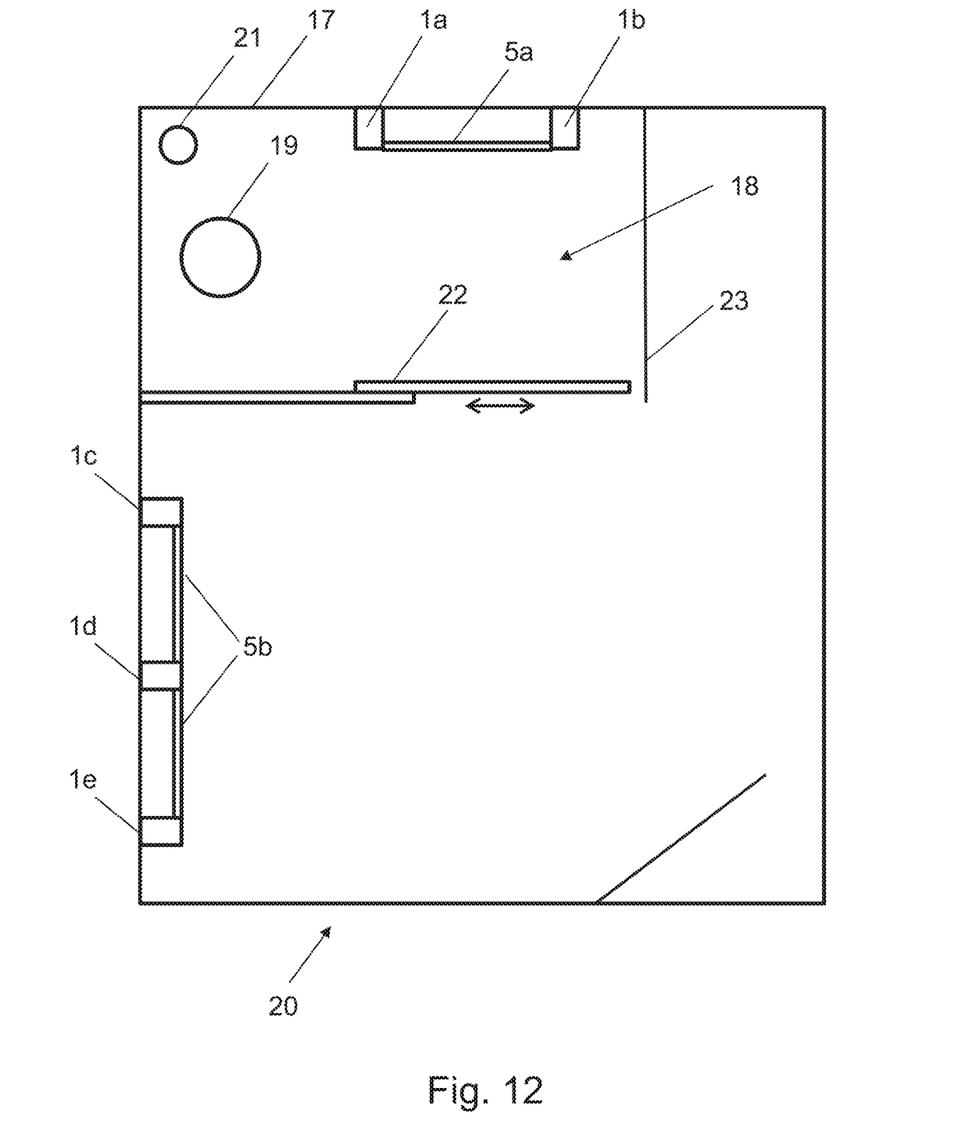
FIG. 12 illustrates a bathroom containing a shower area and multiple fitting assemblies according to the present disclosure.

FIG. 12 illustrates a bathroom (washroom) 20 containing a shower area 18 which is formed on two sides by the bathroom wall 17, on a further side by a fixed partition 23 (e.g. formed of glass) and on a fourth side by a sliding door 22 (e.g. formed of glass). The shower area contains a shower head 19 and drain 21. The shower area could alternatively not require the sliding door 22 or partition 23, e.g. if it is part of a wet room open to the rest of the bathroom 20. Inside the shower area 18 an elongate member 5a is supported by two fitting assemblies 1a and 1b according to the present disclosure. The elongate member 5a may be a guide rail, a rail for supporting a towel or part of a pipe for carrying water from a supply to a hand-held or overhead shower head, for example. Outside of the shower 18 but within the bathroom 20, three fitting assemblies according to the present disclosure 1c, 1d and 1e are provided on the bathroom wall 17 for supporting a second elongate member 5b, such as a towel rail. The central fitting assembly 1d adds further support to the elongate member 5b over the larger expanse. Whilst not illustrated in FIG. 12 it should also be appreciated that the fitting assemblies may be mounted to the wall 17 such that the aperture 12 is in the vertical orientation, rather than horizontal as depicted. This may be applicable when one or more fitting assemblies are used to secure a hose/pipe to the wall, such as a shower hose supplying water to a hand-held or overhead shower head.

Figure 13:
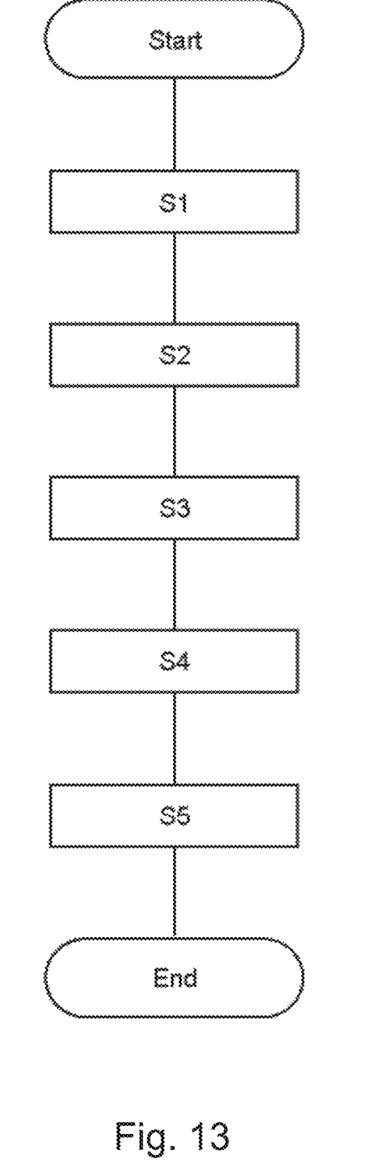
FIG. 13 is a flowchart corresponding to a method according to the present disclosure.

FIG. 13 is a flowchart corresponding to a method according to the present disclosure. Specifically, it corresponds to a method of attaching an elongate member 5 to a surface 17 within a shower area 18, the method comprising the steps of:
 S1: providing a fitting assembly 1 according to the present disclosure;
 S2: fixing the bracket 2 to the surface 17 in the shower area 18;
 S3: inserting the clamp 3 into the cover 4;
 S4: inserting the elongate member 5 through the aperture 12 of the cover 4 and the collar 10 of the clamp 3; and
 S5: sliding the cover 4 containing the clamp 3 onto the bracket 2, thereby causing the receiving portion 15a to urge the finger 9a so as to tighten the collar 10 around the elongate member 5.

It will be understood that the invention is not limited to the embodiments described above. Various modifications and improvements can be made without departing from the concepts disclosed herein. Except where mutually exclusive, any of the features may be employed separately or in combination with any other features and the disclosure extends to all combinations and sub-combinations of one or more features disclosed herein.

What is claimed is:

1. A fitting assembly for attaching an elongate member to a surface within a shower or bath area, the fitting assembly comprising:
 a clamp comprising a collar arranged to receive and abut the elongate member, the collar having an axially extending split, the clamp further comprising a finger extending outwardly from the collar adjacent one side of the split;
 a cover comprising an aperture arranged to receive the elongate member, the cover arranged to retain the clamp within such that the collar is axially aligned with the aperture and further arranged to prevent rotation of the clamp with respect to the cover; and
 a bracket arranged to be fixed to the surface and to receive and retain the cover containing the clamp, the bracket comprising a receiving portion comprising one or more ribs positioned on one or more interior side walls of the bracket and arranged to urge the finger so as to compress the collar portion at the split, thereby clamping the elongate member within the collar.

2. The fitting assembly of claim 1, wherein the clamp comprises a pair of opposing fingers extending outwardly from the collar adjacent either side of the split, the one or more ribs arranged to urge the opposing fingers towards each other, thereby compressing the collar portion at the split and clamping the elongate member within the collar when the cover containing the clamp is engaged with the bracket.

3. The fitting assembly of claim 1, wherein the cover comprises one or more projections or recesses located on an interior surface of the cover, which are arranged to engage with one or more corresponding recesses or projections of the clamp with a snap fit to thereby retain the clamp within the cover.

4. The fitting assembly of claim 1, wherein the bracket comprises one or more locking tabs arranged to engage with one or more corresponding notches provided on the cover, to thereby lock the cover and the bracket together when the cover containing the clamp is engaged with the bracket.

5. The fitting assembly of claim 1, wherein the bracket comprises one or more screw holes for fixing the bracket to the surface by means of one or more screws.

6. A fitting assembly for attaching an elongate member to a surface within a shower or bath area, the fitting assembly comprising:
   a clamp comprising a collar arranged to receive and abut the elongate member, the collar having an axially extending split, the clamp further comprising a pair of opposing fingers extending outward from the collar adjacent either side of the split; and
   a bracket arranged to be fixed to the surface and to receive and retain the clamp, the bracket comprising a receiving portion comprising one or more ribs positioned on one or more interior side walls of the bracket and arranged to urge the opposing fingers towards each other to thereby compress the collar portion at the split and clamp the elongate member within the collar;
   wherein the one or more fingers of the clamp comprise one or more outwardly facing recessed slots arranged to interlock with the receiving portion of the bracket.

7. A fitting assembly according to claim 6, wherein the bracket comprises one or more screw holes for fixing the bracket to the surface by means of one or more screws.

8. A shower or bath area comprising an elongate member supported by one or more fitting assemblies according to claim 1.

9. A shower or bath area according to claim 8, comprising at least one of a shower cubicle, a shower enclosure, and a bathtub.

10. A shower or bath area comprising an elongate member supported by one or more fitting assemblies according to claim 6.

11. A shower or bath area according to claim 10, comprising at least one of a shower cubicle, a shower enclosure, or a bathtub.

12. A method of attaching an elongate member to a surface within a shower or bath area, the method comprising:
   providing a fitting assembly according to claim 1;
   fixing the bracket to the surface in the shower or bath area;
   inserting the clamp into the cover;
   inserting the elongate member through the aperture of the cover and the collar of the clamp; and
   sliding the cover containing the clamp onto the bracket, thereby causing the receiving portion to urge the finger so as to tighten the collar around the elongate member.

13. A method of attaching an elongate member to a surface within a shower or bath area, the method comprising:
   providing a fitting assembly according to claim 6;
   fixing the bracket to the surface in the shower or bath area;
   inserting the elongate member through the collar of the clamp; and
   sliding the clamp onto the bracket, thereby causing the collar to tighten around the elongate member to attach the elongate member to the surface.

* * * * *